US011579262B2

(12) United States Patent
Schnitzer et al.

(10) Patent No.: US 11,579,262 B2
(45) Date of Patent: Feb. 14, 2023

(54) OPERATING METHOD AND CONTROL UNIT FOR A LIDAR SYSTEM, LIDAR SYSTEM, AND WORKING DEVICE

(71) Applicant: Robert Bosch GmbH, Stuttgart (DE)

(72) Inventors: Reiner Schnitzer, Reutlingen (DE); Tobias Hipp, Hechingen (DE)

(73) Assignee: Robert Bosch GmbH, Stuttgart (DE)

( * ) Notice: Subject to any disclaimer, the term of this patent is extended or adjusted under 35 U.S.C. 154(b) by 600 days.

(21) Appl. No.: 16/620,014

(22) PCT Filed: May 9, 2018

(86) PCT No.: PCT/EP2018/061962
§ 371 (c)(1),
(2) Date: Dec. 6, 2019

(87) PCT Pub. No.: WO2018/224234
PCT Pub. Date: Dec. 13, 2018

(65) Prior Publication Data
US 2021/0080544 A1  Mar. 18, 2021

(30) Foreign Application Priority Data

Jun. 8, 2017  (DE) .......................... 102017209643.8

(51) Int. Cl.
*G01S 17/10* (2020.01)
*G01S 7/484* (2006.01)
*G01S 17/931* (2020.01)
*G01S 7/4861* (2020.01)
*G01S 7/487* (2006.01)

(52) U.S. Cl.
CPC .............. *G01S 7/484* (2013.01); *G01S 7/487* (2013.01); *G01S 7/4861* (2013.01); *G01S 17/10* (2013.01); *G01S 17/931* (2020.01)

(58) Field of Classification Search
CPC ........ G01S 7/484; G01S 7/4861; G01S 7/487; G01S 17/10; G01S 17/931; G01S 7/481
See application file for complete search history.

(56) References Cited

U.S. PATENT DOCUMENTS 10,386,487 B1 *  8/2019  Wilton .................. G01S 7/4865
2009/0315135 A1  12/2009  Finkelstein et al.
(Continued)

FOREIGN PATENT DOCUMENTS

DE  102014207599 A1  10/2015
JP  2004130290 A  4/2004
JP  2012530917 A  12/2012

OTHER PUBLICATIONS

International Search Report for PCT/EP2018/061962, dated Aug. 9, 2018.

*Primary Examiner* — Jonathan M Hansen
(74) *Attorney, Agent, or Firm* — Norton Rose Fulbright US LLP; Gerard Messina

(57) ABSTRACT

An operating method for a LIDAR system that is operable by pulse sequence encoding and designed with a SPAD-based detector element, in which a down time of the SPAD-based detector element is detected, and in the transmission mode of the LiDAR system, a minimum time interval of transmission pulses of primary light to be transmitted in direct chronological succession is dimensioned in such a way that the minimum time interval at least approximately corresponds to the down time.

14 Claims, 5 Drawing Sheets

(56) References Cited

U.S. PATENT DOCUMENTS

| | | |
|---|---|---|
| 2014/0233942 A1 | 8/2014 | Kanter |
| 2016/0291138 A1 | 10/2016 | Drader et al. |
| 2018/0195900 A1* | 7/2018 | Delic .................... G01J 1/44 |
| 2018/0364337 A1* | 12/2018 | Wilton ................ G01S 17/10 |
| 2019/0302242 A1* | 10/2019 | Fenigstein ............ G01S 17/06 |
| 2019/0324126 A1* | 10/2019 | Bulteel ................ G01S 17/36 |

* cited by examiner

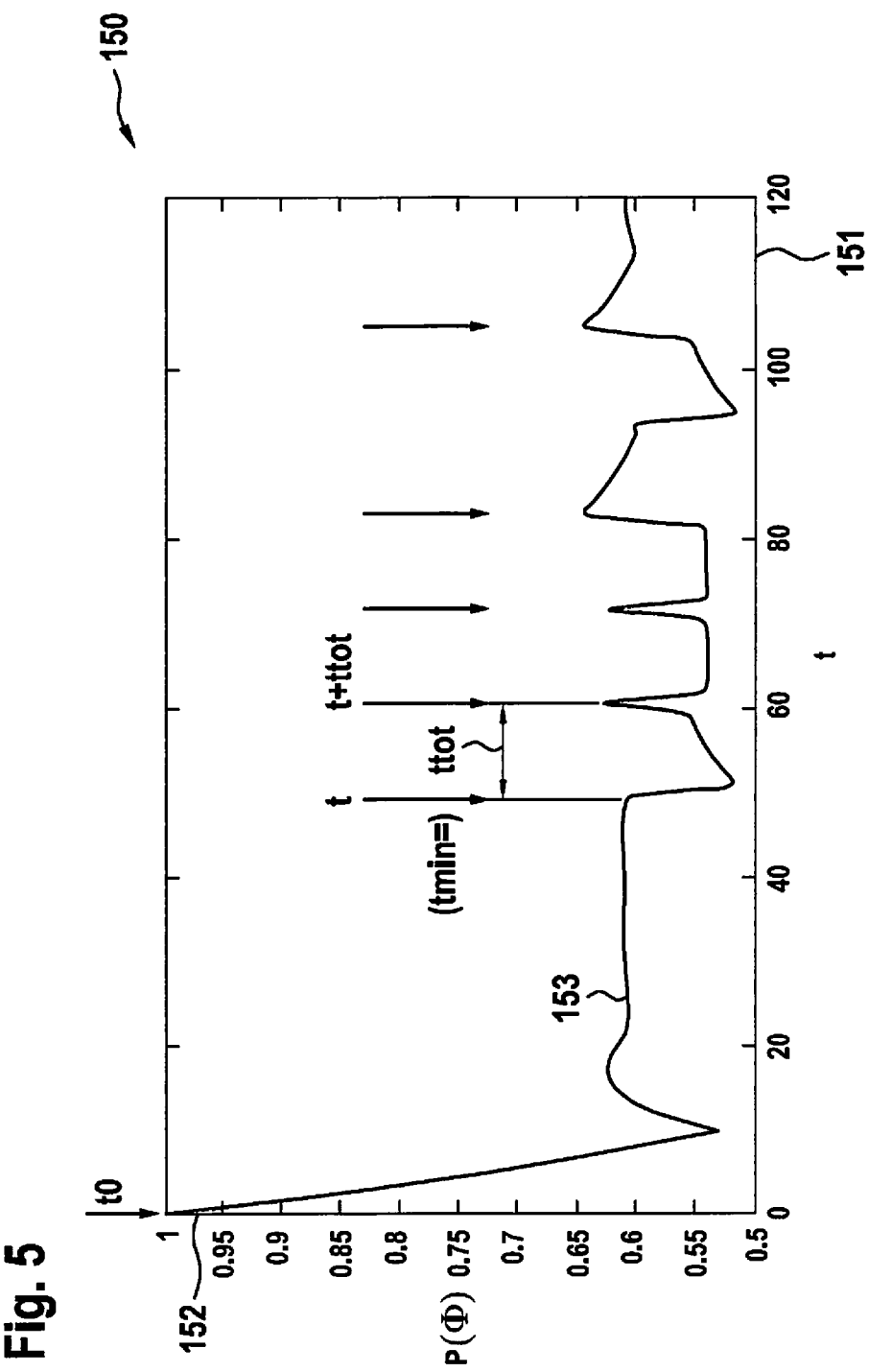

OPERATING METHOD AND CONTROL UNIT FOR A LIDAR SYSTEM, LIDAR SYSTEM, AND WORKING DEVICE

FIELD

The present invention relates to an operating method and a control unit for a LIDAR system, a LIDAR system per se, and a working device, in particular a vehicle.

BACKGROUND INFORMATION

For recognizing the surroundings of working devices and in particular vehicles, so-called LIDAR systems are being increasingly used that are designed to act on a visual field with light or infrared radiation, and to detect and evaluate radiation reflected from the visual field in order to analyze the visual field and detect objects contained therein.

In order to reduce crosstalk and interferences from other signal sources in LIDAR systems operated in a pulsed manner, a pulse sequence-encoded procedure is often used for operating the particular LIDAR system, it being possible to obtain an improvement in the recognition accuracy in conjunction with signal-adapted filters. However, in many situations this recognition accuracy is not sufficient.

SUMMARY

An example operating method according to the present invention for a LIDAR system that is operable by pulse sequence encoding may have the advantage over the related art that a further increase in the recognition accuracy may be obtained without additional outlay of equipment. According to the present invention, this may be achieved in that an operating method for a LIDAR system that is operable by pulse sequence encoding is provided that is operated using a SPAD-based detector element, in which a down time of the SPAD-based detector element is detected, and in the transmission mode of the LIDAR system, a minimum time interval of transmission pulses of primary light to be transmitted or are transmitted in direct chronological succession is determined and/or dimensioned in such a way that the minimum time interval at least approximately corresponds to the down time, and in particular at least slightly exceeds the down time. Due to the properties of a SPAD-based detector element when an appropriate down time occurs, merely waiting for the down time after a detection event advantageously results in an increased detection probability for arriving photons, so that an appropriate selection of the time interval for transmitted transmission pulses, and correspondingly a resulting time interval of received pulses, increases the probability of detecting incident secondary light of a reception pulse.

Preferred refinements of the present invention are described herein.

According to one advantageous refinement, in the example operating method according to the present invention, particularly simple relationships result when the minimum time interval of transmission pulses of primary light to be transmitted or are transmitted in direct chronological succession has a constant value.

In the example operating method according to the present invention, particularly suitable relationships result when the minimum time interval of transmission pulses of primary light to be transmitted or are transmitted in direct chronological succession, in relation to the down time of the SPAD-based detector element, satisfies the following relationship (I)

$$t_{tot} < t_{min} \leq (1+x) \cdot t_{tot},$$

where $t_{tot}$ is the down time of the SPAD-based detector element, $t_{min}$ is the minimum time interval of transmission pulses of primary light in direct chronological succession, and x is an at least temporarily constant positive value that in particular is different from zero.

Value x may satisfy the relationship $x \leq 0.3$, preferably the relationship $x \leq 0.2$, and more preferably the relationship $x \leq 0.1$, and in particular the relationship $x = 0.1$.

A situation in which minimum time interval $t_{min}$ satisfies the relationship $t_{min} = 1.1 \cdot t_{tot}$ is of particular value.

In one refinement of the example operating method according to the present invention, a particularly high degree of flexibility results when the down time of the SPAD-based detector element is detected by a measuring method, in particular repeatedly and/or in conjunction with a machine learning method. As a result of these measures, sensor replacement, aging processes, and/or changing operating conditions, each of which may also result in different effective down times for the detector element, may be taken into account, in particular without the need for intervention by the user.

Alternatively or additionally, it may be provided that the down time of the SPAD-based detector element is repeatedly detected, in particular during normal operation of the underlying LIDAR system. This means in particular that during continuous operation of the LIDAR system, it may be checked whether changes in the detection behavior for the underlying SPAD-based detector element have resulted, in order to then take them into account if necessary.

Moreover, the present invention relates to a control unit for a LIDAR system that is configured to carry out, prompt, or control a specific embodiment of the operating method according to the present invention, and/or to be used in an operating method according to the present invention.

Furthermore, the present invention also provides a LIDAR system for optically detecting a visual field as such. The provided LIDAR system is configured to carry out the operating method according to the present invention or to be used in such an operating method according to the present invention. In particular, the example LIDAR system according to the present invention is configured to be used in conjunction with a working device or with a vehicle.

The example LIDAR system according to the present invention is in particular designed with transmitter optics for providing and transmitting primary light into the visual field, receiver optics for receiving secondary light from the visual field, and which include a detector assembly in which the secondary light is detectable via at least one SPAD-based detector element, and/or a control unit that is designed according to the present invention for controlling the operation of the transmitter optics and/or of the receiver optics, in particular based on a down time of the SPAD-based detector element.

The present invention also provides an example working device and in particular a vehicle that is provided with a LIDAR system designed according to the present invention for optically detecting a visual field.

BRIEF DESCRIPTION OF THE DRAWINGS

Specific embodiments of the present invention are described in greater detail below with reference to the figures.

FIGS. 4 and 5 explain, in the form of graphs, the relationship between the photon flux and the average detection rate in a contiguous sequence of individual pulses of the primary light.

DETAILED DESCRIPTION OF EXAMPLE EMBODIMENTS

Figure 1:
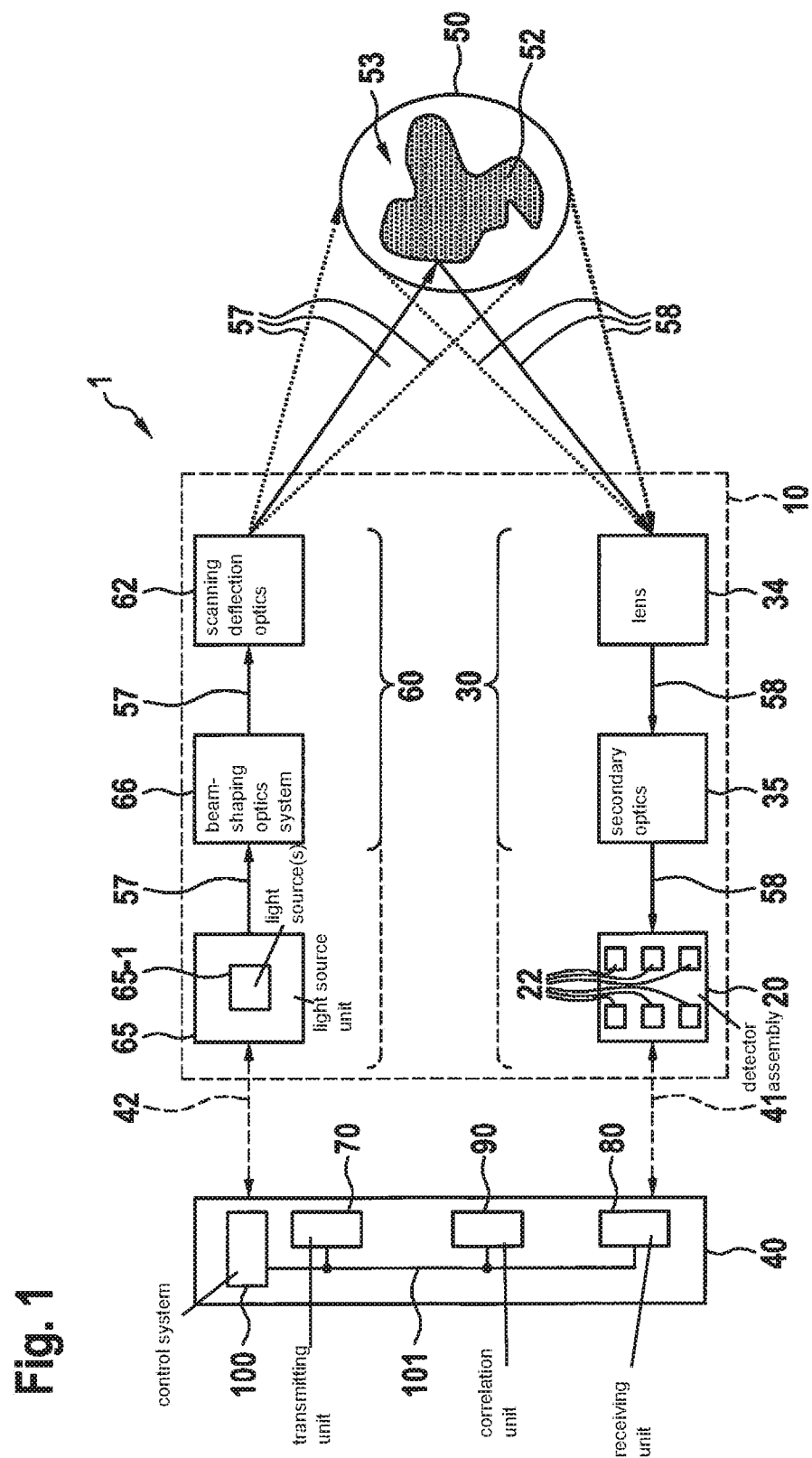
FIG. 1 shows one specific embodiment of the LIDAR system according to the present invention in the form of a schematic block diagram.

Exemplary embodiments of the present invention and the technical background are described in greater detail below, with reference to FIGS. 1 through 5. Identical and equivalent elements and components as well as elements and components having an identical or equivalent function are denoted by the same reference numerals. A detailed description of the denoted elements and components is not provided in each case of their occurrence.

The described features and other properties may be arbitrarily separated from one another and arbitrarily combined with one another without departing from the core of the present invention.

FIG. 1 schematically shows one specific embodiment of LIDAR system 1 according to the present invention in the form of a block diagram.

LIDAR system 1, illustrated in FIG. 1, is suitable for pulse sequence-encoded operation, and is made up of a control and evaluation unit 40 as well as optical system 10 on which operation of LIDAR system 1 is based, including a light source unit 65, for example including one or multiple light sources 65-1, transmitter optics 60, receiver optics 30, and a detector assembly 20. The control of the operation of LIDAR system 1 as well as the evaluation of the signals received by LIDAR system 1 are carried out by control and evaluation unit 40.

During operation, light source unit 65 is prompted to generate and emit primary light 57 by control and prompting with the aid of control and evaluation unit 40 via a control line 42. Primary light 57 is modeled with the aid of beam-shaping optics system 66, depending on the application, and is then transmitted, with the aid of scanning deflection optics 62 on the transmission side, into a visual field 50 with an object 52 contained therein.

The focus of the present invention is a pulsed operation of light source unit 65 and particular light sources 65-1, for example in the form of pulsed laser sources.

The light that is reflected from visual field 50 and from object 52 is also referred to as secondary light 58, and is received in receiver optics 30 with the aid of a lens 34, optionally further treated by provided secondary optics 35, and then transmitted to a detector assembly 20 that includes one or multiple sensor element(s) or detector element(s) 22. Sensor elements 22 of detector assembly 20 generate signals, representing secondary light 58, that are transmitted to control and evaluation unit 40 with the aid of a control and measuring line 41.

According to the present invention, provided detector elements 22 of detector assembly 20 operate according to the single-photon avalanche diode (SPAD) principle.

Thus, the basis of such a detector element 22 is an avalanche photodiode, which upon absorption of just a single photon goes into saturation, and therefore is preferably operated with an appropriate upstream circuit, for example in Geiger mode. Under these circumstances, according to the present invention use may also be made of the increase in the detection probability after expiration of a certain time period that is greater than down time ttot provided by the properties of the photodiode of detector element 22, which, however, presumes operation according to the operating method according to the present invention.

The specific embodiment of control and evaluation unit 40 according to FIG. 1 is made up of a higher-order control system 100 that is connected to a transmitting unit 70, a receiving unit 80, and a correlation unit 90 with the aid of a bus 101.

Control system 100 and units 70, 80, and 90 may in fact be designed as separate components within control and evaluation unit 40.

However, a LIDAR system 1 may be provided in which one or multiple of the components of control and evaluation unit 40 are combined with one another and designed in an integrated manner, so that the illustration according to FIG. 1 is only used as the basis for depicting the components that are present;

however, this does not necessarily reflect the specific architecture, which may deviate from the illustration in FIG. 1.

According to the present invention, during operation of the LIDAR system the focus is on the pulse principle, in which visual field 50 in pulsed operation of light source unit 65 is illuminated with light sources 65-1, using primary light 57, and examined.

To allow accurate detection, according to the present invention down time ttot of SPAD-based detector element 22 of LIDAR system 1 is detected and taken into account in the transmission mode, in that a minimum time interval tmin of transmission pulses 57-1, . . . , 57-4 of primary light 57 transmitted in direct chronological succession (explained in greater detail below and shown in the further figures) is dimensioned in such a way that the minimum time interval at least approximately corresponds to down time ttot, and in particular at least slightly exceeds it, as discussed in detail above.

As a further measure for increasing the detection probability of the pulse sequences using transmission pulses 57-1, . . . , 57-4 of primary light 57 by receiver optics 30, in conjunction with detector assembly 20 in control unit 40, a signal correlation may be established between transmitting unit 70 and receiving unit 80 with the aid of correlation unit 90, for example in the sense of a signal-adapted filter or optimal filter.

The coupling between control unit 40 and light source unit 65 takes place via control line 42. The coupling between control unit 40 and detector assembly 20 takes place via control line 41.

Figure 2:
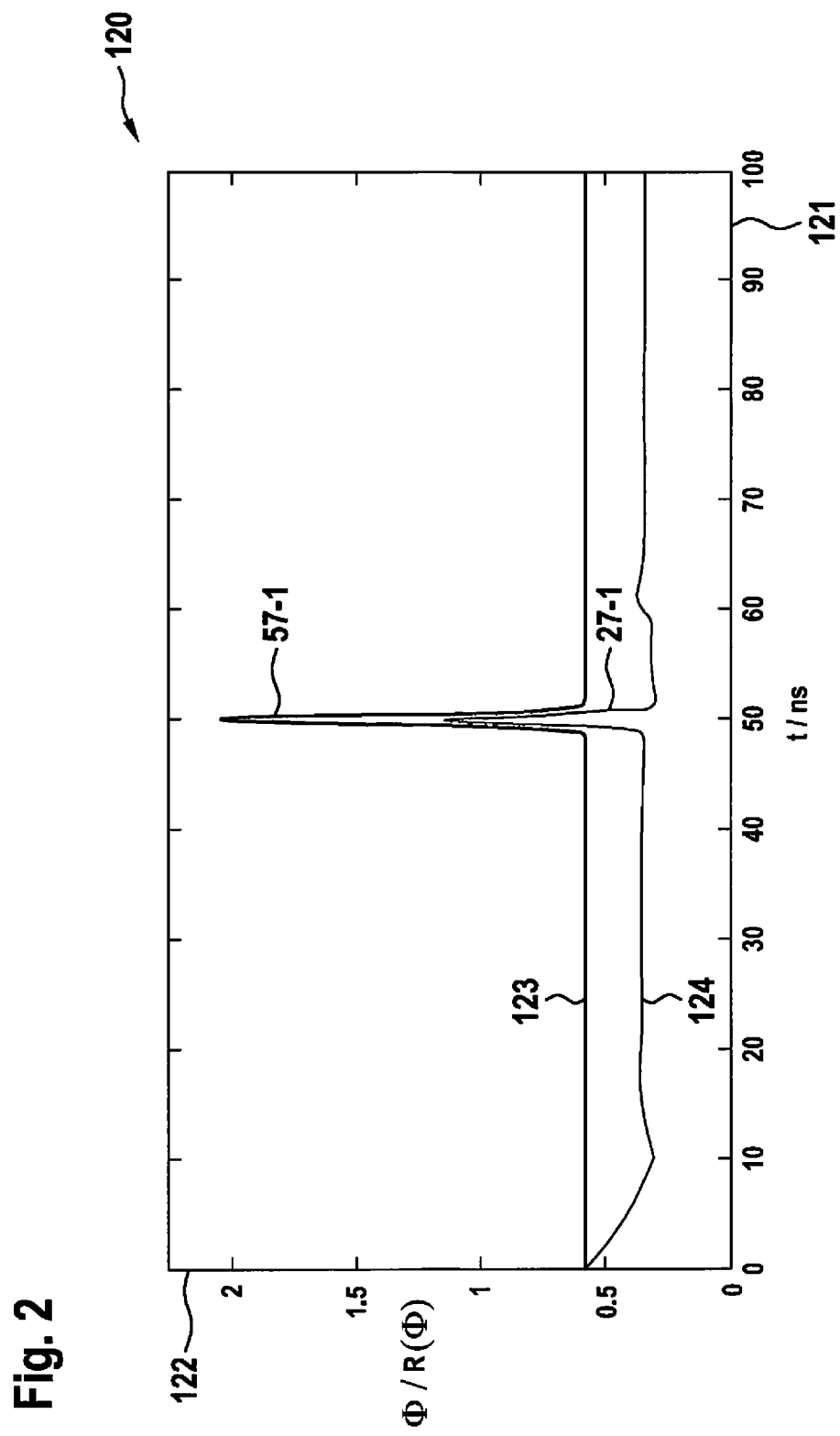
FIGS. 2 and 3 explain, in the form of graphs, the relationship between the down time and the detection probability in a SPAD-based detector element, based on an individual pulse of the primary light.
Figure 3:
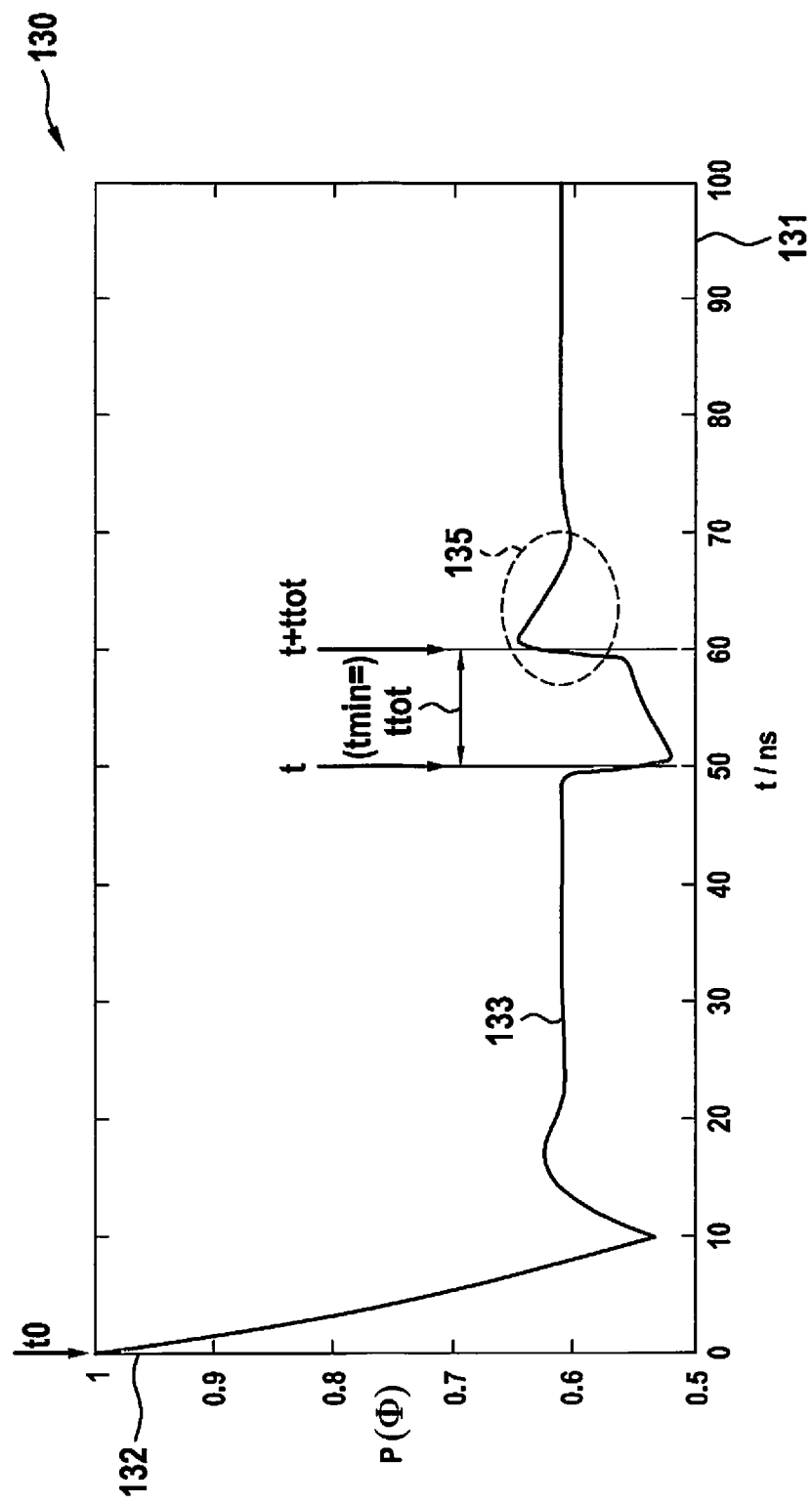

FIGS. 2 and 3 explain, in the form of graphs 120 and 130, respectively, the relationship between down time ttot and detection rate $R(\Phi)$ or detection probability $P(\Phi)$ in a SPAD-based detector element 22 as a function of photon flux $\Phi$, based on an individual pulse 57-1 of primary light 57.

Time t is plotted in each case on abscissas 121 and 131.

Photon flux $\Phi$ for track 123, which represents an individual pulse 57-1 of primary light 57, as well as detection rate $R(\Phi)$ in track 124 for this individual pulse 57-1, are plotted as ordinate 122 in graph 120 in FIG. 2. The measuring units are relative units. It is apparent that detection rate $R(\Phi)$ of track 124 essentially follows photon flux $\Phi$ of track 123.

Detection probability P(Φ) for SPAD-based detector element 22, normalized to 1, is plotted as ordinate 132 in graph 130 in FIG. 3.

In graph 130 in FIG. 3, detection probability P(Φ) shows the plotted curve of track 133, and for a continuous photon flux at the start of the excitation at point in time t=0, detection probability P(Φ) is initially at a maximum of 1 at t0=0, and in the course of the continuous excitation stabilizes to a certain value, in the present case approximately 0.6. An individual pulse 57-1, i.e., an excitation with increased photon flux Φ, then takes place at point in time t. After the temporary increase in detection probability P(Φ) due to the photon flux that has been increased by pulse 57-1, the detection probability initially drops, and after down time ttot elapses at point in time t+ttot, shows an increased value, namely, a peak in the area of graph 130 indicated with circle 135.

Figure 4:
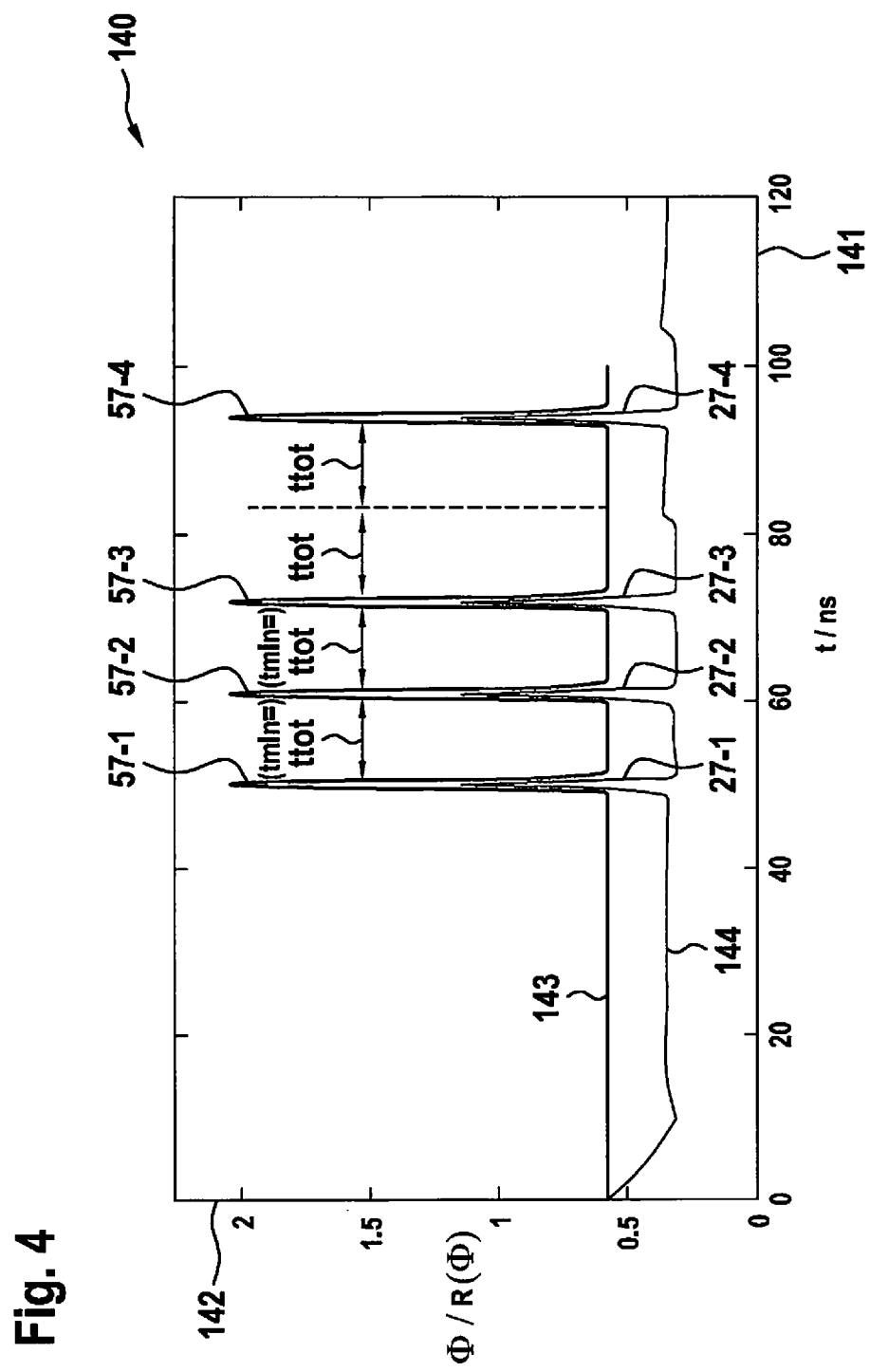

FIGS. 4 and 5 explain, in the form of graphs 140 and 150, respectively, the relationship between down time ttot and detection rate R(Φ) or detection probability P(Φ) in a SPAD-based detector element 22 as a function of photon flux Φ, based on a pulse sequence of a plurality of individual pulses 57-1, . . . , 57-4 of primary light 57.

Time t is plotted in each case on abscissas 141 and 151.

Photon flux Φ for track 143, which represents the pulse sequence with individual pulses 57-1, . . . , 57-4 of primary light 57, as well as detection rate R(Φ) in track 144 for this pulse sequence, are plotted as ordinate 142 in graph 140 in FIG. 4. The measuring units are relative units. It is apparent that detection rate R(Φ) of track 144 essentially follows photon flux Φ of track 143.

Graph 150 according to FIG. 5 illustrates the corresponding dependency of detection probability P(Φ) on SPAD-based detector element 22 in track 153, once again based on a continuous photon flux which in the steady state results in a detection probability of approximately 0.6, an excitation with additional individual pulses 57-1, . . . , 57-4 taking place at point in time t=t0+50 ns. At the points in time marked by vertical, downwardly directed arrows, local maxima for detection probability P(Φ) are once again apparent in track 153, which have a time interval relative to one another that corresponds to down time ttot of SPAD-based detector element 22.

Correspondingly, for the excitation with a pulse sequence of individual pulses 57-1, . . . , 57-4 of primary light 57 according to FIG. 4, a time interval between the individual pulses of pulse sequence 57-1, . . . , 57-4 may be selected that approximately corresponds to down time ttot of SPAD-based detector element 22, as the result of which according to the present invention, detection probability P(Φ) that is increased at these points in time is advantageously utilized, resulting in a correspondingly increased detection rate R(Φ).

Further details in this regard are provided in the following description, in which these and other features and characteristics of the present invention are explained in greater detail based on the following discussion:

In LIDAR systems, it is conventional to transmit a randomly or pseudorandomly encoded sequence of light pulses, instead of individual pulses, as primary light 57.

For the detection in receiver 20 of receiver optics 30, the received pulse sequence is correlated with the transmitted pulse sequence, for example with the aid of an optimal filter or a signal-adapted filter (matched filter). This has the positive effect that the immunity to interference is improved over other LIDAR systems 1 operated in parallel, due to the fact that the sensor ideally is sensitive only to the pulse sequence that it has transmitted itself, but not to pulses of other systems.

In the event that lasers 65-1 or laser driver circuits that are present, and not the eye safety standard, represent the limiting factor for the transmitted power, there is an additional advantage that the allowed energy here is distributed over multiple pulses.

An object of the present invention is to enhance the advantages of an encoded multipulse LIDAR system by using single-photon avalanche diodes (SPADs) as detector element 22.

Due to the particular properties of these detector diodes as detector elements 22, with an appropriately correct selection of the pulse sequence, detection probability P(Φ) of pulses 57-1, . . . , 57-4 within a sequence of pulses may be increased. Pulse time intervals tmin within a sequence are advantageously derived from down time ttot of the underlying SPAD, so that, for example, the pulse interval is in the range of 1.0 to 1.1 times down time ttot, so that the following applies: $1.0 \times ttot \leq tmin \leq 1.1 \times$ down time.

It is a core feature of the present invention that minimum time intervals tmin between pulses 57-1, . . . , 57-4 within a pulse sequence for emitted primary light 57 are made as a function of, and in particular derived from, down time ttot of a SPAD that is used as a detector or detector component 22. Detection probability P(Φ), and consequently detection rate R(Φ), for the pulse sequence are thus increased according to the present invention.

System 1 is designed as a typical pulsed LIDAR sensor, with the special feature that SPADs are used as detector elements 22 of detector assembly 20. By operating the SPADs in Geiger mode, the detection of a photon results in a down time ttot that is defined and known due to the geometry of the SPAD and the pixel circuitry.

FIG. 2 describes, in the form of a graph 120, average count rate R(Φ) in track 124 of a SPAD as a sensor element 22 on an arbitrary input photon flux Φ of track 123, likewise illustrated in the figure. The gap between the two tracks 123, 124 for the count rate and for photon flux Φ is attributed to down time ttot of SPAD 22, since on account of down time ttot, arbitrarily high photon rates are not possible.

FIG. 3 shows, for assumed photon flux Φ, probability P(Φ) as track 133, as a function of time, that SPAD 22 is ready for photon detection.

In this example, SPAD 22 is activated by photon flux Φ at point in time t0=0. At this point in time, the readiness probability is initially equal to 1. Probability P(Φ) for given unchanging DC flux Φ of photons subsequently stabilizes at approximately 0.6, until an intensity pulse of photons is received at point in time t=50 ns.

Due to the higher photon rate at this moment, probability P(Φ) of a SPAD detection is higher, and consequently the readiness probability is subsequently lower. On this basis it may in turn be deduced that, due to the increased probability of the detection at the moment of the pulse, the readiness probability is higher subsequent to a down time ttot compared to the steady state. This results in the overshoot in track 133 for detection probability P(Φ). This is illustrated by the area highlighted in circle 135.

The present invention advantageously makes use precisely of this superelevation of detection probability P(Φ) by coordinating the pulse sequence in terms of time, in particular exactly, in such a way that in the temporal range of the superelevation of readiness probability P(Φ), the next of pulses 57-1, . . . , 57-4 in the sequence is received by transmitting, with appropriate temporal coordination, transmission pulses 57-1, . . . , 57-4 of primary light 57.

FIG. 4 shows an example of a pulse sequence in track 143, in the present case, the binary value sequence 1, 1, 1, 0, 1.

It is apparent that pulses 57-1, . . . , 57-4 have a higher amplitude at the second and third position due to the described effect. The situation for a sequence repetition is illustrated. During use, sensor 22 will frequently repeat this sequence for each measurement, for example with approximately 10 to 500 repetitions, so that the effect may make a significant contribution to the overall detection probability.

Likewise, it is also possible to use circuitry techniques, for example macropixels and concurrence detection, for suppressing background light in conjunction with SPADs 22.

The LIDAR features according to the present invention may be used together with SPAD-based detector assembly 22 in all LIDAR systems 1 with pulsed operation.

What is claimed is:

1. An operating method for a LIDAR system, the LIDAR system being operable by pulse sequence encoding and includes a SPAD-based detector element, the method comprising:
   repeatedly detecting, during normal operation of the LIDAR system, a down time of the SPAD-based detector element; and
   in a transmission mode of the LIDAR system, transmitting transmission pulses of primary light in direct chronological succession with a minimum time interval between the transmission pulses of primary light transmitted in direct chronological succession; and
   setting the minimum time interval, according to the detection of the down time, to approximately correspond to the detected down time.

2. The operating method as recited in claim 1, wherein the minimum time interval is dimensioned in such a way that it at least slightly exceeds the down time.

3. The operating method as recited in claim 1, wherein the minimum time interval of the transmission pulses transmitted in direct chronological succession has a constant value.

4. The operating method as recited in claim 1, wherein the minimum time interval of the transmission pulses of primary light transmitted in direct chronological succession, in relation to the down time of the SPAD-based detector element, satisfies the following relationship:

$$ttot < tmin \leq (1+x) \cdot ttot,$$

wherein ttot is the down time of the SPAD-based detector element, tmin is the minimum time interval of the transmission pulses of primary light in direct chronological succession, and x is an at least temporarily constant positive value that is different from zero.

5. The operating method as recited in claim 4, wherein the value x satisfies the relationship $x \leq 0.3$.

6. The operating method as recited in claim 4, wherein the value x satisfies the relationship $x \leq 0.2$.

7. The operating method as recited in claim 4, wherein the value x satisfies the relationship $x \leq 0.1$.

8. The operating method as recited in claim 4, wherein the value x satisfies the relationship $x = 0.1$.

9. The operating method as recited in claim 1, wherein the down time of the SPAD-based detector element is detected by repeatedly and/or in conjunction with a machine learning method.

10. A control unit for a LIDAR system, the LIDAR system being operable by pulse sequence encoding and includes a SPAD-based detector element, the control unit configured to:
    repeatedly detect, during normal operation of the LIDAR system, a down time of the SPAD-based detector element;
    in a transmission mode of the LIDAR system, control a transmission of transmission pulses of primary light in direct chronological succession with a minimum time interval between the transmission pulses of primary light transmitted in direct chronological succession; and
    set the minimum time interval, according to the detection of the down time, to approximately correspond to the detected down time.

11. A LIDAR system for pulse sequence-encoded optical detection of a visual field for a working device or a vehicle, LIDAR system comprising:
    transmitter optics configured to provide and transmit primary light into the visual field;
    receiver optics configured to receive secondary light from the visual field, and which include a detector assembly in which the secondary light is detectable via at least one SPAD-based detector element; and
    a control unit configured to control operation of the transmitter optics and/or the receive optics, the control unit configured to:
      repeatedly detect, during normal operation of the LIDAR system, a down time of the SPAD-based detector element;
      in a transmission mode of the LIDAR system, control a transmission of transmission pulses of primary light in direct chronological succession with a minimum time interval between the transmission pulses of primary light transmitted in direct chronological succession; and
      set the minimum time interval, according to the detection of the down time, to approximately correspond to the detected down time.

12. The LIDAR system as recited in claim 11, wherein the LIDAR system is situated in a working device.

13. The LIDAR system as recited in claim 11, wherein the LIDAR system is situated in a vehicle.

14. A vehicle, comprising:
    a LIDAR system for pulse sequence-encoded optical detection of a visual field for a working device or a vehicle, LIDAR system including:
      transmitter optics configured to provide and transmit primary light into the visual field;
      receiver optics configured to receive secondary light from the visual field, and which include a detector assembly in which the secondary light is detectable via at least one SPAD-based detector element; and
      a control unit configured to control operation of the transmitter optics and/or the receive optics, the control unit configured to:
        detect a down time of the SPAD-based detector element;
        in a transmission mode of the LIDAR system, control a transmission of transmission pulses of primary light in direct chronological succession with a minimum time interval between the transmission pulses of primary light transmitted in direct chronological succession; and set the minimum time interval, according to the detection of the down time, to approximately correspond to the detected down time.

\* \* \* \* \*